June 4, 1968 J. L. SIMON 3,387,172

AUTOMATIC DEGAUSSING CIRCUIT

Filed Dec. 1, 1966

INVENTOR
JULIUS L. SIMON
BY Mueller, Aichele & Rauner
ATTYS.

United States Patent Office 3,387,172

Patented June 4, 1968

3,387,172

AUTOMATIC DEGAUSSING CIRCUIT

Julius L. Simon, Morton Grove, Ill., assignor to Motorola, Inc., Franklin Park, Ill., a corporation of Illinois Filed Dec. 1, 1966, Ser. No. 598,430

9 Claims. (Cl. 315—8)

ABSTRACT OF THE DISCLOSURE

The degaussing circuit is used in a rapid warm-up color television receiver for automatically demagnetizing metal parts of the picture tube each time the receiver is turned on. An inductance coil is positioned adjacent to the picture tube and coupled in parallel with a negative temperature coefficient resistor. A high initial current through the coils decays as the resistor heats up to provide the required demagnetization current. A switch shorts out the coils and the resistor after demagnetization is completed.

*Background of the invention*

The tri-gun color television picture tube has a shadow mask consisting of a large number of apertures to properly restrict the beam from each gun to its associated phosphor dots on the picture tube screen. The shadow mask along with a frame to mount the mask and additional metal structure within the tube may become undesirably magnetized by external fields. Unless corrected, such magnetization may degrade color reproduction.

Demagnetization or degaussing may be accomplished by positioning a coil adjacent to the picture tube and providing circuitry to cause a decaying alternating current to flow through the coil with a high initial amplitude. Such operation may be performed manually each time the television set is moved to another position where the earth's magnetic field is different or when stray magnetic fields contaminate the screen. More recently, however, automatic degaussing circuits have been developed so that each time the television set is turned on, demagnetizing current is applied to the coils. In a television set using electron tubes, a current having such a characteristic is readily available due to the fact that receiver warm-up time is relatively slow so that after the high initial peak charging current there is a decay to a very low value. However, such a current in a transistor set is not available so that means must be provided in order to develop this current.

There are additional factors which are particularly important in transistorized color television sets. First, it is desirable that the degausser recycling time be minimized or, in other words, if the set is turned off, the degaussing circuit should return to its initial condition relatively fast so that the viewer need not wait a long time before the set may again be turned on with automatic degaussing. Secondly, the amount of time necessary to complete the degaussing operation should also be minimized. This is especially important in the type of set having circuitry to continually energize the picture tube filament windings to provide a picture within a few seconds after the set is turned on. If the degaussing is not completed before this time, varying color patterns will appear on the screen.

*Summary of the invention*

It is, therefore, an object of this invention to provide an improved degaussing circuit for a rapid warm-up television receiver which automatically demagnetizes the metal structure in a tri-gun picture tube each time the receiver is turned on.

Another object is to provide a degaussing circuit which has a fast recycling time in order to minimize the interval for which the viewer must wait between the time he turns off the set to the time he may again turn it on with automatic degaussing.

Another object is to provide a degaussing circuit which develops a rapidly decaying alternating current to demagnetize a picture tube before an image is visually present.

Another object is to provide means to short out the degaussing circuitry after the degaussing operation is completed so that effects therefrom are not viewable on the picture tube screen, so that no power loss is caused by said circuitry, and so that the operating receiver current does not flow through temperature sensitive elements in the degaussing circuitry to thereby slow up its recycling time.

In a particular form of the invention, a color television receiver includes a cathode ray tube with filament elements and a receiver circuit for applying video signals to the tube. A filament energizing circuit coupled to the filament includes a limited current supply path for continually supplying partial energizing current to the filaments when the receiver is in an off condition, and a switching circuit for applying full energizing current to the filaments when the receiver is in an on condition so that the cathode ray tube is fully operative within the order of five seconds following turn on of the receiver. In addition, the active devices in the receiver circuit do not require a warm-up time greater than the order of 5 seconds whereby the cathode ray tube and the receiver circuit are operative to reproduce an image within the order of 5 seconds following turn-on of the receiver.

Metal structure in the cathode ray tube such as the shadow mask and the frame for the shadow mask are particularly susceptible to become magnetized by external effects such as the earth's magnetic field or other stray magnetic fields. A degaussing circuit for demagnetizing the cathode ray tube is connected with alternating current supply means and includes a pair of serially connected coils positioned adjacent to the cathode ray tube coupled in parallel with a negative temperature coefficient (NTC) resistor, whereby the current through the resistor increases with increasing temperature to thereby develop a decaping demagnetization current through the coils. It is important that the demagnetization operation be completed quickly because if the demagnetization current is allowed to flow while the picture is on, the set may appear to be working improperly. The mass and composition of the NTC resistor is selected so that the decay to a predetermined minimum value occurs before the cathode ray tube is operative. A switch connected in parallel with the coils and the resistor has a time constant selected to close prior to the time that the cathode ray tube is operative and after the current in the coils has decayed to a minimum value, so that the operating receiver current flows only through the switch and not through the resistor and coils. Thus, a low mass NTC resistor may be used in order to allow the current through the pair of coils to decay quite rapidly.

*Description of the preferred embodiment*

Figures 1, 2:
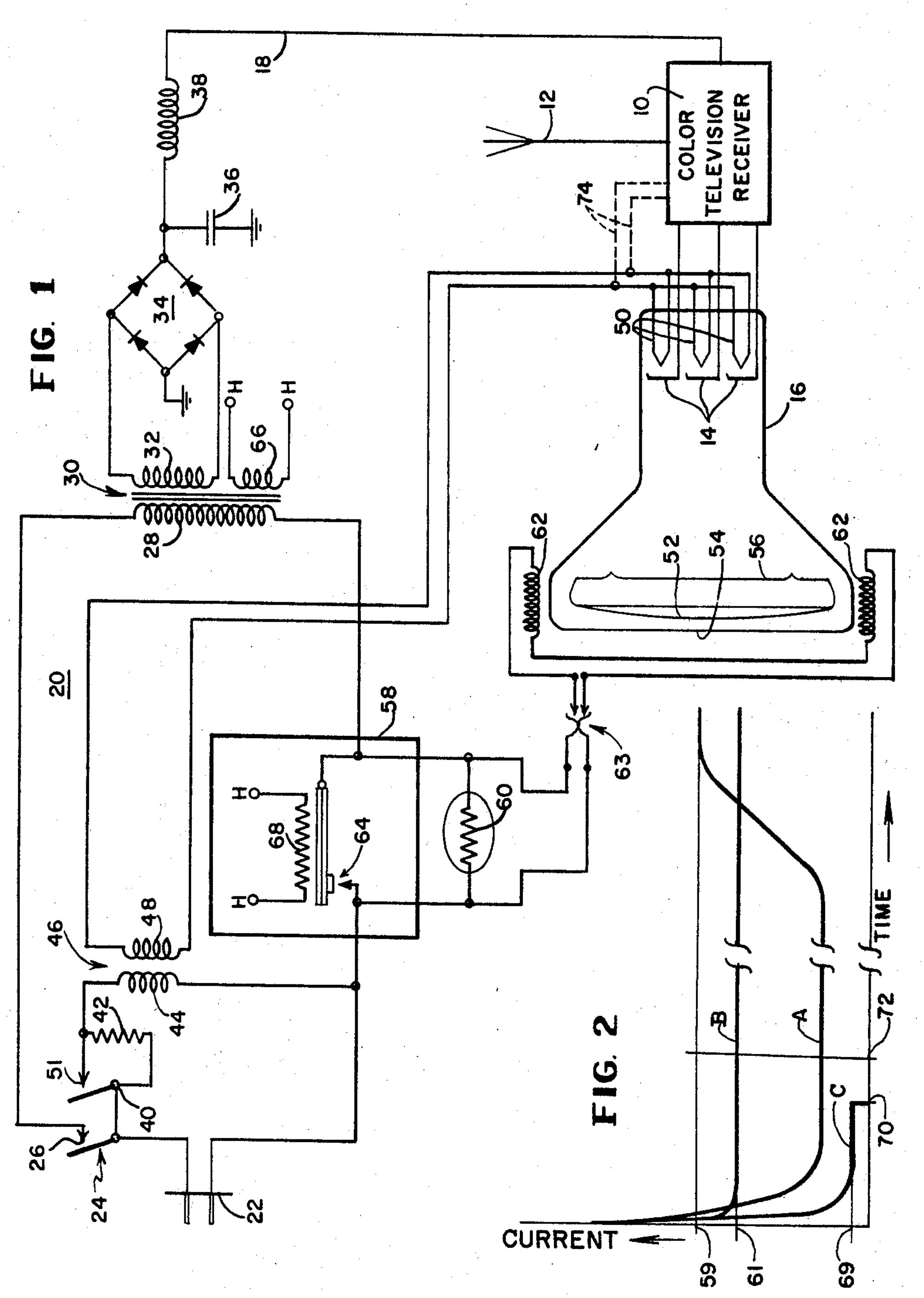
FIG. 1 is a diagram partially in schematic and partially in block showing the invention.
FIG. 2 illustrates a series of waveforms useful in explaining the operation of the circuit of FIG. 1.

Referring to FIG. 1, there is shown a color television receiver 10 which processes television signals picked up by antenna 12 and converts them into color information for the multiple cathodes 14 of cathode ray tube 16. Power supply 20 develops biasing potentials for receiver 10 on lead 18 and consists of a plug 22 which may be inserted in a wall outlet to furnish an AC voltage. A double pole, single throw switch 24 serves on the on-off function and is accessible to the viewer. A terminal 26 of the switch is conected to primary winding 28 of transformer 30. Secondary winding 32 is connected to a bridge rectifier circuit 34 which in combination with load capacitor 36 and inductor 38 provides a DC voltage on lead 18 (generally, of course, more than one DC voltage would be developed by the power supply 20 but for the sake of convenience and simplicity only one is shown here). A filament energizing circuit including a further terminal 40 on switch 24 is connected through a circuit limiting resistor 42 to primary winding 44 of transformer 46. A secondary winding 48 is connected to the multiple filaments 50 of cathode ray tube 16.

In operation, with on-off switch 24 in the position shown, no AC current will flow through primary winding 28 of transformer 30. A limited current supply path comprised of a resistor 42 and transformer 46 allows a partial energizing current to flow through resistor 42 into primary winding 44 so that a filament voltage is developed across secondary winding 48. In this manner, whenever the television set is plugged in, there is a small amount of current to keep the cathode ray tube partially on all the time. In the closed position, that is when the receiver is on, switch 24 engages contact 26 so that AC current is applied to the bridge rectifier circuit 34. Resistor 42 is shorted out by the engagement of contact 51 so that full energizing current is allowed to flow in filaments 50 thereby allowing the cathode ray tube 16 to be in full operating condition for displaying a picture.

A shadow mask 52 in cathode ray tube 16 has a number of apertures for aligning the electron beams from multiple cathodes 14 with their associated phosphor dots on the screen 54. A frame 56 extends circumferentially about the inner face of the tube and, as shown, is used to mount the shadow mask. The frame, mask and additional metal structure within the picture tube is susceptible to become magnetized by the earth's magnetic field or other stay fields. In order to demagnetize the metal structure, the decaying alternating current is required. The peak value of the current must be at least high enough to cause momentary magnetization exceeding that which may exist in the metal structure in the cathode ray tube. Although one cycle in theory will cause complete demagnetization, if the current is not shut off precisely when it passes through zero, there will be some residual magnetism left in or added to what is already present. Allowing the AC to decay and removing the current when it reaches a selected minimum value will insure a minimum amount of residual magnetism.

In a television set using electron tubes, this decaying current is readily available as can be seen by the shape of waveform A in FIG. 2 which illustrates the current in the secondary winding of the power transformer in a tube set. A high amplitude peak current for charging capacitor 36 is developed when the set is turned on followed by a decaying current due to the fact that the color television receiver 10 draws very little current until the electron tubes therein heat up. After a period of time which may be on the order of 20 to 30 seconds, the tubes become operable and the receiver draws full current as indicated by level 59.

If, however, a large number of the active elements in color television receiver 10 are semiconductor devices, the heat up time delay is minimal. The waveform B of FIG. 2 illustrates the receiver current and as shown has an initially high amplitude but since there is a relatively short warm-up time, the current rapidly drops to its operating level 61. As was explained previously, if the degaussing circuit does not decay to a value close to zero, there is a possibility that some residual magnetism may remain. The invention described herein is particularly advantageous in this environment to develop the required decaying current. The degaussing circuit includes a thermal switch 58, a negative temperature coefficient (NTC) resistor 60, and a pair of coils 62 positioned adjacent to the cathode ray tube 16. The coils are connected into the degaussing circuit by a plug 63. The plug contacts short together to protect NTC resistor 60 if the coils are removed, by shunting the receiver current from the resistor when the set is first turned on. The thermal switch 58 consists of a pair of normally open contacts 64 in series with the AC line and a heating element 68 thermally coupled to the contacts and connected in parallel with a tertiary winding 66 on transfomer 30 as indicated by H, H.

Upon closure of on-off switch 24, current will flow through the primary winding 28 in order to charge up the load capacitor 36. Since the contacts 64 are normally open, this current flows through coils 62 and through resistor 60. However, since NTC resistor 60 has a relatively large resistance at room temperature, almost all of this current flows through the coils 62. A small portion does flow through the resistor which causes it to heat up so that its resistance decreases which causes less current flow through coils 62 and more current through resistor 60 which causes its temperature and the current through it to further increase to cause additional decrease in the current through coil 62, etc. Waveform C of FIG. 2 shows the resultant effect and as can be seen, the current through the coils has a high initial AC amplitude which decays towards a minimum value 69.

During the interval that this decaying current is formed through coils 62, an AC signal is developed across tertiary winding 66 of transformer 30 to heat up heating element 68 which serves to close contacts 64 when the element reaches a predetermined temperature. The time constant of the switch 58 is selected to cause closure of the contacts 64 after completion of demagnetization, that is, at time 70 when the coil current has decayed substantially. Thereafter, receiver current does not flow through NTC resistor 60 so that its mass may be desirably low. When the on-off switch 24 is opened to turn off the receiver, contacts 64 of thermal switch 58 will again open in preparation to demagnetize the cathode ray tube the next time the set is turned on.

This circuit arrangement is particularly advantageous in a television set where the picture appears on the screen within the order of five seconds following turn-on. Such a short delay is accomplished by first, using transistors for the active devices in color television receiver 10 and second, allowing a partial energizing current to flow into the multiple filaments 50 of cathode ray tube 16 during the off condition, as explained before. These two features will cause a picture to appear on screen 54 within the order of five seconds, which is labeled as time 72 in FIG. 2, so that the demagnetizing current should decay to the minimum value 69 before that time.

The speeds necessary may be appreciated more fully by considering the times involved in a television set having no provision to partially energize the filaments of the cathode ray tube. Even if transistors are used in such a set, there would be a delay on the order of 10 seconds between turn-on or energization of the set and the time that the filaments are warm enough to produce an image, whereas in the type of receiver herein described using transistors and partially on cathode ray tube filaments, this time is on the order of five seconds. However, it is not necessary that transistors be used in the receiver to provide a rapid on feature as long as none of the active devices therein have a warm-up time exceeding the time when the cathode ray tube is fully operative. This may be accomplished by providing any vacuum tubes employed in color television receiver 10 with a partial energizing current from power supply 20 as indicated generally by dotted leads 74. In order to insure that demagnetization is completed within the five second interval, the mass (or warm-up characteristic) of NTC resistor 60 which determines the speed of decay, is selected to be small enough (or short enough) to cause the current to be at a predetermined minimum value 69 at time 70, that is before the picture appears at time 72.

At time 70, contacts 64 close so that current ceases to flow through the coils 62 and since the mass of resistor 60 is chosen so that the current is at a minimum, there is little residual magnetism. It is important to note that the receiver current is drawn solely through contacts 64 upon completion of the demagnetization operation. If this were not the case and the receiver current flowed through resistor 60, it would have to have a high mass in order to withstand the constantly present receiver current. A high mass would mean a longer time constant so that the AC current in coils 62 would not decay until after time 70. In such case the picture would appear before demagnetization is completed and the viewer would observe rapidly changing colors. It should be noted that in a television set primarily using electron tubes, the picture would appear only after a 20–30 second delay which occurs during the rising portion of waveform A of FIG. 2.

An additional advantage in this arrangement is the improved recycling time which is defined as the interval which must lapse between the time the set is turned off and the time when it again may be turned on. Since NTC resistor 60 is selected to have a small mass, or in other words a fast warm-up characteristic, it cools down rapidly upon closure of contacts 64 so that its resistance is near its nominal value shortly after the set is initially turned on. However, the recycling time is limited by the thermal time constant of heating element 68 which must cool down sufficiently to open contacts 64 before the degaussing circuit is in a proper state to demagnetize. This time constant can be on the order of 3 minutes which is an improvement over circuits heretofore available in which the recycling time may be as much as 20 minutes. This long recycling time is due, at least, in part to the fact that in these prior circuits, the receiver current continually flows through the NTC resistor thereby necessitating a resistor with a high mass which results in a longer time to cool down. Here, however, within a few seconds after turn-on, the NTC resistor is shorted out so that the operating receiver current does not flow therethrough.

What has been described, therefore, is a degaussing circuit for a color television receiver having rapid warm-up features which demagnetizes the metal structure in a tri-gun cathode ray tube within a short time after the television set is turned on. The recycling performance is also improved over that which has been heretofore available.

What is claimed is:

1. In a color television receiver having a cathode ray tube with filament means and metal structure subject to become magnetized and a receiver circuit coupled to the cathode ray tube for applying video signals thereto, the combination of, a filament energizing circuit connected to the filament means of the cathode ray tube and including a limited current supply path for continually supplying partial energizing current to the filament means and a switching circuit for applying full energizing current to the filament means, whereby the cathode ray tube is operative to reproduce an image within a limited time compared to warm-up time of the filament means from an unenergized condition, the receiver circuit having amplifier devices therein requiring no warm-up time exceeding said limited time so that the receiver circuit is operative within said limited time, a degaussing circuit for demagnetizing the metal structure including coil means positioned adjacent to the cathode ray tube, alternating current voltage supply means, and a negative temperature coefficient resistor connected in parallel with said coil means and responsive to the alternating current voltage to develop current through said coil means which decays to a predetermined minimum value low enough to demagnetize the metal structure, said resistor having a warm-up characteristic to decrease the current through said coil means to said minimum value before said limited time, the degaussing circuit further including time dependent switching means connected in parallel with said coil means and said negative temperature coefficient resistor and closing within said limited time so that thereafter current ceases to flow through said resistor and through said coil means.

2. The color television receiver according to claim 1 with said limited time being on the order of five seconds, the warm-up characteristic of said negative temperature coefficient resistor selected to decrease the current through said coil means to said predetermined minimum value within the order of said five seconds.

3. The color television receiver according to claim 1 in which said time dependent switching means comprises a pair of normally open contacts and actuating means thermally coupled to said contacts having a time constant selected to respond to the alternating current voltage and close said contacts within said limited time.

4. The color television receiver according to claim 1 in which said time dependent switching means comprises a pair of normally open contacts and a heating element thermally coupled to said contacts, said heating element having a selected warm-up characteristic to close said contacts within said limited time, said characteristic being further selected to cause said contacts to open within the order of three minutes after removal of the alternating current voltage so that said degaussing circuit is then operable to demagnetize said coil means upon reapplication of said voltage.

5. The color television receiver according to claim 1, a number of the active devices in said receiver circuit having semiconductor devices so that the receiver current does not decay sufficiently to demagnetize the metal structure in the cathode ray tube, said degaussing circuit serving to cause said receiver current to decay to said predetermined minimum value for demagnetizing the metal structure.

6. The color television receiver according to claim 1, said degaussing circuit including means to conduct receiver current in shunt with said negative temperature coefficient resistor automatically when said coil means is uncoupled therefrom.

7. The color television receiver according to claim 1, said alternating current voltage supply means including a power transformer having primary and secondary windings, said supply means further including a rectifier network coupled to said secondary winding to convert the alternating current voltage into direct current voltages for said receiver circuit, said degaussing circuit connected in series with said primary winding so that the receiver current flows therethrough.

8. The color television receiver according to claim 1, said alternating current voltage supply means including a power transformer having primary, secondary and tertiary windings, said supply means further including a rectifier network coupled to said secondary winding to convert the alternating current voltage into direct current voltages for said receiver circuit, said degaussing circuit connected in series with said primary winding so that the receiver current flows therethrough, said time dependent switching means comprising said tertiary winding across which a portion of the alternating current voltage is developed and a pair of normally open contacts, said switching means further including a heating element connected in parallel with said tertiary winding and thermally coupled to said contacts and having a selected thermal time constant to respond to the alternating current voltage to close said contacts within said limited time.

9. The color television receiver according to claim 8, said thermal time constant being further selected to cause said contacts to open within the order of three minutes after the alternating current voltage is removed so that said degaussing circuit is then operable to demagnetize said coil means upon reapplication of the alternating current voltage.

References Cited

UNITED STATES PATENTS

| | | | |
|---|---|---|---|
| 3,249,795 | 5/1966 | Dietch | 315—8 |
| 3,317,781 | 5/1967 | Barbin et al. | 315—8 |
| 3,333,143 | 7/1967 | Van Anrooy et al. | 315—8 |
| 3,344,307 | 9/1967 | Van Anrooy et al. | 315—8 |

JAMES W. LAWRENCE, *Primary Examiner.*

V. LAFRANCHI, *Assistant Examiner.*